(12) United States Patent
Madar et al.

(10) Patent No.: US 10,475,315 B2
(45) Date of Patent: Nov. 12, 2019

(54) SYSTEM AND METHOD FOR CONFIGURING SURVEILLANCE CAMERAS USING MOBILE COMPUTING DEVICES

(71) Applicant: Sensormatic Electronics, LLC, Boca Raton, FL (US)

(72) Inventors: Piero Madar, Indianapolis, IN (US); Anthony Burke, Noblesville, IN (US); Scott Humphreys, Indianapolis, IN (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 15/076,713

(22) Filed: Mar. 22, 2016

(65) Prior Publication Data
US 2017/0278365 A1 Sep. 28, 2017

(51) Int. Cl.
*H04N 7/18* (2006.01)
*G08B 13/196* (2006.01)
(Continued)

(52) U.S. Cl.
CPC ....... *G08B 13/1968* (2013.01); *G06K 7/1092* (2013.01); *G06K 7/1417* (2013.01);
(Continued)

(58) Field of Classification Search
CPC .................................................. G08B 13/1968
(Continued)

(56) References Cited

U.S. PATENT DOCUMENTS 3,217,098 A 11/1965 Oswald
4,940,925 A 7/1990 Wand et al.
(Continued)

FOREIGN PATENT DOCUMENTS

EP 2 164 003 A1 3/2010
EP 2 538 672 A1 12/2012
(Continued)

OTHER PUBLICATIONS

International Search Report and the Written Opinion of the International Searching Authority, dated May 31, 2017, from International Application No. PCT/US2017/023430, filed Mar. 21, 2017. Fourteen pages.
(Continued)

*Primary Examiner* — Leron Beck
(74) *Attorney, Agent, or Firm* — HoustonHogle LLP (57) ABSTRACT

A method and system for configuring surveillance cameras can be used to leverage emerging trends in surveillance camera systems, while also enabling the configuration of cameras to operate in such systems. The method comprises displaying configuration images on mobile computing devices and enabling the cameras to view and capture those images within image data. The configuration images are then derived from image data from the surveillance cameras using integrated or separate analytics systems. Then, configuration information from the mobile device can be paired with corresponding surveillance cameras by reference to the configuration images. In one example, cloud image data storage is allocated as part of this setup and configuration process.

16 Claims, 3 Drawing Sheets

(51) Int. Cl.
  *G06K 7/10* (2006.01)
  *G06K 7/14* (2006.01)
(52) U.S. Cl.
  CPC ..... *G08B 13/196* (2013.01); *G08B 13/19684* (2013.01); *H04N 7/181* (2013.01)
(58) Field of Classification Search
  USPC ........................................................ 358/149
  See application file for complete search history.

(56) References Cited

U.S. PATENT DOCUMENTS

| | | |
|---|---|---|
| 5,164,827 A | 11/1992 | Paff |
| 5,204,536 A | 4/1993 | Vardi |
| 5,317,394 A | 5/1994 | Hale et al. |
| 5,729,471 A | 3/1998 | Jain et al. |
| 5,850,352 A | 12/1998 | Moezzi et al. |
| 5,940,538 A | 8/1999 | Spiegel et al. |
| 5,951,695 A | 9/1999 | Kolovson |
| 5,969,755 A | 10/1999 | Courtney |
| 6,341,183 B1 | 1/2002 | Goldberg |
| 6,359,647 B1 | 3/2002 | Sengupta et al. |
| 6,581,000 B2 | 6/2003 | Hills et al. |
| 6,643,795 B1 | 11/2003 | Sicola et al. |
| 6,724,421 B1 | 4/2004 | Glatt |
| 6,812,835 B2 | 11/2004 | Ito et al. |
| 6,970,083 B2 | 11/2005 | Venetianer et al. |
| 7,091,949 B2 | 8/2006 | Hansen |
| 7,242,423 B2 | 7/2007 | Lin |
| 7,286,157 B2 | 10/2007 | Buehler |
| 7,342,489 B1 | 3/2008 | Milinusic et al. |
| 7,382,244 B1 | 6/2008 | Donovan et al. |
| 7,409,076 B2 | 8/2008 | Brown et al. |
| 7,428,002 B2 | 9/2008 | Monroe |
| 7,450,735 B1 | 11/2008 | Shah et al. |
| 7,456,596 B2 | 11/2008 | Goodall et al. |
| 7,460,149 B1 | 12/2008 | Donovan et al. |
| 7,529,388 B2 | 5/2009 | Brown et al. |
| 7,623,152 B1 | 11/2009 | Kaplinsky |
| 7,623,676 B2 | 11/2009 | Zhao et al. |
| 7,733,375 B2 | 6/2010 | Mahowald |
| 7,996,718 B1 | 8/2011 | Ou et al. |
| 8,249,301 B2 | 8/2012 | Brown et al. |
| 8,300,102 B2 | 10/2012 | Nam et al. |
| 8,325,979 B2 | 12/2012 | Taborowski et al. |
| 8,482,609 B1 | 7/2013 | Mishra et al. |
| 8,483,490 B2 | 7/2013 | Brown et al. |
| 8,502,868 B2 | 8/2013 | Buehler et al. |
| 8,594,482 B2 | 11/2013 | Fan et al. |
| 8,675,074 B2 | 3/2014 | Salgar et al. |
| 8,723,952 B1 | 5/2014 | Rozenboim |
| 8,849,764 B1 | 9/2014 | Long et al. |
| 8,995,712 B2 | 3/2015 | Huang et al. |
| 9,015,167 B1 | 4/2015 | Ballou et al. |
| 9,058,520 B2 | 6/2015 | Xie et al. |
| 9,094,615 B2 | 7/2015 | Aman et al. |
| 9,129,179 B1 | 9/2015 | Wong |
| 9,158,975 B2 | 10/2015 | Lipton et al. |
| 9,168,882 B1 | 10/2015 | Mirza et al. |
| 9,197,861 B2 | 11/2015 | Saptharishi et al. |
| 9,280,833 B2 | 3/2016 | Brown et al. |
| 9,412,269 B2 | 8/2016 | Saptharishi et al. |
| 9,495,614 B1 | 11/2016 | Boman et al. |
| 9,594,963 B2 | 3/2017 | Bobbitt et al. |
| 9,641,763 B2 | 5/2017 | Bernal et al. |
| 9,674,458 B2 | 6/2017 | Teich et al. |
| 9,785,898 B2 | 10/2017 | Hofman et al. |
| 9,860,554 B2 | 1/2018 | Samuelsson et al. |
| 9,965,680 B2 | 5/2018 | Burke et al. |
| 9,967,446 B2 | 5/2018 | Park |
| 2002/0104098 A1 | 8/2002 | Sustak et al. |
| 2003/0107649 A1 | 6/2003 | Flickner et al. |
| 2003/0169337 A1 | 9/2003 | Wilson et al. |
| 2005/0012817 A1 | 1/2005 | Hampapur et al. |
| 2005/0057653 A1 | 3/2005 | Maruya |
| 2006/0001742 A1 | 1/2006 | Park |
| 2006/0173856 A1 | 8/2006 | Jackson et al. |
| 2006/0181612 A1 | 8/2006 | Lee et al. |
| 2006/0239645 A1 | 10/2006 | Curtner et al. |
| 2006/0243798 A1 | 11/2006 | Kundu et al. |
| 2007/0178823 A1 | 8/2007 | Aronstam et al. |
| 2007/0182818 A1 | 8/2007 | Buehler |
| 2007/0279494 A1 | 12/2007 | Aman et al. |
| 2007/0294207 A1 | 12/2007 | Brown et al. |
| 2008/0004036 A1 | 1/2008 | Bhuta et al. |
| 2008/0101789 A1 | 5/2008 | Sharma |
| 2008/0114477 A1 | 5/2008 | Wu |
| 2008/0158336 A1 | 7/2008 | Benson et al. |
| 2009/0237508 A1 | 9/2009 | Arpa et al. |
| 2009/0268033 A1 | 10/2009 | Ukita |
| 2009/0273663 A1 | 11/2009 | Yoshida |
| 2009/0284601 A1 | 11/2009 | Eledath et al. |
| 2010/0013917 A1 | 1/2010 | Hanna et al. |
| 2010/0110212 A1 | 5/2010 | Kuwahara et al. |
| 2010/0153182 A1 | 7/2010 | Quinn et al. |
| 2010/0232288 A1 | 9/2010 | Coatney et al. |
| 2011/0043631 A1 | 2/2011 | Marman et al. |
| 2011/0128384 A1 | 6/2011 | Tiscareno et al. |
| 2011/0246626 A1 | 10/2011 | Peterson et al. |
| 2011/0289119 A1 | 11/2011 | Hu et al. |
| 2011/0289417 A1 | 11/2011 | Schaefer et al. |
| 2011/0320861 A1 | 12/2011 | Bayer et al. |
| 2012/0072420 A1 | 3/2012 | Moganti et al. |
| 2012/0098969 A1 | 4/2012 | Wengrovitz et al. |
| 2012/0206605 A1 | 8/2012 | Buehler et al. |
| 2012/0226526 A1 | 9/2012 | Donovan et al. |
| 2013/0166711 A1 | 6/2013 | Wang et al. |
| 2013/0169801 A1 | 7/2013 | Martin et al. |
| 2013/0223625 A1 | 8/2013 | de Waal et al. |
| 2013/0278780 A1 | 10/2013 | Cazier et al. |
| 2013/0343731 A1 | 12/2013 | Pashkevich et al. |
| 2014/0085480 A1 | 3/2014 | Saptharishi |
| 2014/0172627 A1 | 6/2014 | Levy et al. |
| 2014/0211018 A1 | 7/2014 | de Lima et al. |
| 2014/0218520 A1 | 8/2014 | Teich et al. |
| 2014/0282991 A1* | 9/2014 | Watanabe ............... G06F 21/34 726/9 |
| 2014/0330729 A1 | 11/2014 | Colangelo |
| 2015/0039458 A1 | 2/2015 | Reid |
| 2015/0092052 A1 | 4/2015 | Shin et al. |
| 2015/0121470 A1 | 4/2015 | Rongo et al. |
| 2015/0208040 A1 | 7/2015 | Chen et al. |
| 2015/0215583 A1 | 7/2015 | Chang |
| 2015/0244992 A1 | 8/2015 | Buehler |
| 2015/0249496 A1 | 9/2015 | Muijs et al. |
| 2015/0294119 A1 | 10/2015 | Gundam et al. |
| 2015/0358576 A1 | 12/2015 | Hirose et al. |
| 2015/0379729 A1 | 12/2015 | Datta et al. |
| 2015/0381946 A1* | 12/2015 | Renkis ............. G08B 13/19656 348/47 |
| 2016/0065615 A1 | 3/2016 | Scanzano et al. |
| 2016/0224430 A1 | 8/2016 | Long et al. |
| 2016/0225121 A1 | 8/2016 | Gupta et al. |
| 2016/0269631 A1 | 9/2016 | Jiang et al. |
| 2016/0357648 A1 | 12/2016 | Keremane et al. |
| 2016/0379074 A1 | 12/2016 | Nielsen et al. |
| 2017/0193673 A1 | 7/2017 | Heidemann et al. |
| 2017/0277785 A1 | 9/2017 | Burke |
| 2017/0277947 A1 | 9/2017 | Burke et al. |
| 2017/0277967 A1 | 9/2017 | Burke et al. |
| 2017/0278137 A1 | 9/2017 | Burke |
| 2017/0278366 A1 | 9/2017 | Burke et al. |
| 2017/0278367 A1 | 9/2017 | Burke et al. |
| 2017/0278368 A1 | 9/2017 | Burke |
| 2017/0280043 A1 | 9/2017 | Burke et al. |
| 2017/0280102 A1 | 9/2017 | Burke |
| 2017/0280103 A1 | 9/2017 | Burke et al. |
| 2018/0218209 A1 | 8/2018 | Burke et al. |

FOREIGN PATENT DOCUMENTS

| | | |
|---|---|---|
| JP | 2003/151048 A | 5/2003 |
| JP | 2010/074382 A | 4/2010 |

(56) References Cited

FOREIGN PATENT DOCUMENTS

| WO | 2007/030168 A1 | 3/2007 |
|---|---|---|
| WO | 2013/141742 A1 | 9/2013 |
| WO | 2014/114754 A1 | 7/2014 |

OTHER PUBLICATIONS

International Search Report and the Written Opinion of the International Searching Authority, dated Jun. 12, 2017, from International Application No. PCT/US2017/023440, filed on Mar. 21, 2017. Fourteen pages.
International Search Report and the Written Opinion of the International Searching Authority, dated Jun. 19, 2017, from International Application No. PCT/US2017/023436, filed on Mar. 21, 2017. Fourteen pages.
International Search Report and the Written Opinion of the International Searching Authority, dated Jun. 21, 2017, from International Application No. PCT/US2017/023444, filed on Mar. 21, 2017. Thirteen pages.
International Search Report and the Written Opinion of the International Searching Authority, dated Jun. 28, 2017, from International Application No. PCT/US2017/023434, filed on Mar. 21, 2017. Thirteen pages.
International Preliminary Report on Patentability, dated Oct. 4, 2018, from International Application No. PCT/US2017/023440, filed on Mar. 21, 2017. Eight pages.
International Preliminary Report on Patentability, dated Oct. 4, 2018, from International Application No. PCT/US2017/023434, filed on Mar. 21, 2017. Eight pages.
International Preliminary Report on Patentability, dated Oct. 4, 2018, from International Application No. PCT/US2017/023430, filed Mar. 21, 2017. Eight pages.
International Preliminary Report on Patentability, dated Oct. 4, 2018, from International Application No. PCT/US2017/023436, filed on Mar. 21, 2017. Eight pages.
International Preliminary Report on Patentability, dated Oct. 4, 2018, from International Application No. PCT/US2017/023444, filed on Mar. 21, 2017. Seven pages.
Weilin, L., et al., "Personalizaation of Trending Tweets Using Like-Dislike Caegory Model," Procedia Computer Science, 60: 236-245 (2015).

* cited by examiner

SYSTEM AND METHOD FOR CONFIGURING SURVEILLANCE CAMERAS USING MOBILE COMPUTING DEVICES

RELATED APPLICATIONS

This application is related to:

U.S. application Ser. No. 15/076,701 filed on Mar. 22, 2016, entitled "Method and system for surveillance camera arbitration of uplink consumption," now U.S. Patent Publication No. US2017/0278368A1;

U.S. application Ser. No. 15/076,703 filed on Mar. 22, 2016, entitled "Method and system for pooled local storage by surveillance cameras," now U.S. Patent Publication No. US2017/0280102A1;

U.S. application Ser. No. 15/076,704 filed on Mar. 22, 2016, entitled "System and method for designating surveillance camera regions of interest," now U.S. Patent Publication No. US2017/0277967A1;

U.S. application Ser. No. 15/076,705 filed on Mar. 22, 2016, entitled "System and method for deadzone detection in surveillance camera network," now U.S. Patent Publication No. US2017/0278366A1;

U.S. application Ser. No. 15/076,706 filed on Mar. 22, 2016, entitled "System and method for overlap detection in surveillance camera network," now U.S. Patent Publication No. US2017/0278367A1;

U.S. application Ser. No. 15/076,708 filed on Mar. 22, 2016, entitled "System and method for retail customer tracking in surveillance camera network," now U.S. Patent Publication No. US2017/0278137A1;

U.S. application Ser. No. 15/076,709 filed on Mar. 22, 2016, entitled "Method and system for modeling image of interest to users," now U,S. Patent Publication No. US2017/0277785A1;

U.S. application Ser. No. 15/076,710 filed on Mar. 22, 2016, entitled "System and method for using mobile device of zone and correlated motion detection," now U.S. Patent Publication No. US2017/0280103A1;

U.S. application Ser. No. 15/076,712 filed on Mar. 22, 2016, entitled "Method and system for conveying data from monitored scene via surveillance cameras," now U.S. Patent Publication No. US2017/0277947A1; and U.S. application Ser. No. 15/076,717 filed on Mar. 22, 2016, entitled "System and method for controlling surveillance cameras," now U.S. Patent Publication No. US2017/0280043A1.

All of the afore-mentioned applications are incorporated herein by this reference in their entirety.

BACKGROUND OF THE INVENTION

Video surveillance systems are often deployed in schools, government buildings, small businesses, retail stores and corporate offices, and even many residences. These surveillance systems are typically comprised of surveillance cameras that capture image data, image data storage systems that store the image data along with possibly metadata, and increasingly analytics systems that analyze the image data and possibly generate the metadata.

The installation of surveillance systems is often complex and time consuming. First, an installer has to identify and select locations throughout the building, for example, to install the surveillance cameras. Next, the installer has to physically mount the surveillance cameras in the building and supply them with power. Data connections between the surveillance cameras and the image data storage systems and possibly the analytics systems must then be established. In many cases, this requires running data cables from data transmission devices (e.g., routers, switches, and hubs) to all of the devices, although wireless systems are becoming increasingly common.

After the physical installation, the installer must then configure the systems. Generally, configuration of the surveillance camera systems is tedious, requiring the installer to repeatedly enter configuration information such as device names, Internet Protocol (IP) addresses, media access control (MAC) addresses, device locations, and/or port settings for devices. In many cases, the installer has to travel between different locations throughout the building to configure the various components, the network, and any monitoring station.

Recently, the surveillance camera systems have begun using open standards. Among other advantages, this enables users to more easily access the image data from the surveillance cameras. On user devices such as computer workstations and mobile computing devices such as tablets, smart phones and laptop computers, users can access and select image data from specific surveillance cameras for real-time viewing upon and downloading to the user devices. In addition, the users on the user devices can also access previously recorded image data stored on the image data storage systems.

Another trend concerns the analytics systems, which are becoming increasingly powerful. Often, the analytics systems will track moving objects against fixed background models. More sophisticated functions include object detection to determine the presence of an object or classify the type of object or event. The analytics systems generate video primitives or metadata for the detected objects and events, which the analytics systems can further process or send over the data networks to other systems for storage and incorporation into the image data as metadata, for example.

While analytics systems have historically been separate systems apart from the surveillance cameras, the surveillance cameras themselves are increasingly providing this functionality. Integrating the analytics functionality within the cameras themselves has advantages. It eliminates the cost and maintenance associated with deploying a separate analytics system to accomplish the same objective, and enables more efficient analysis by eliminating the messaging overhead associated with sending the image data over the data network for analysis by the separate analytics systems, in examples.

Similar trends have emerged in the case of image data storage systems. Surveillance cameras are being offered that include image data storage on the camera itself. Such surveillance cameras are especially attractive to smaller organizations such as stores, small companies, and local offices that want to reduce installation and maintenance expenses. Each camera can function as a stand-alone unit, and as a result there is no need to have a specialized image data storage system. With the advent of improved image compression on one hand, and the decreasing costs of data storage on the other hand, each surveillance camera is often able to store substantially larger amounts of image data than it generates.

At the same time, remote cloud image data storage systems are also available. These systems can offer a number of advantages over local image data storage systems. The organizations have fewer components to buy and install, which lowers both purchase and depreciation cost. Organizations can also pay on a per usage basis for infrequently used value-added services. Finally, the service providers of the cloud storage systems bear the responsibility of maintaining and upgrading the storage systems and their capabilities, the cost of which the service providers can share across their managed clients.

SUMMARY OF THE INVENTION

The present invention concerns a method and system for configuring surveillance cameras. It can be used to leverage many of the previously discussed trends, while also enabling the configuration of cameras to operate in such systems.

In general, according to one aspect, the invention features a method for configuring surveillance cameras. The method comprises displaying configuration images on user devices, deriving the configuration images from image data from the surveillance cameras, and pairing configuration information from the user devices with corresponding surveillance cameras by reference to the configuration images.

The step of displaying the configuration images could comprise displaying QR codes, for example.

Typically, image data from the surveillance cameras is sent to a registration server that derives the configuration images from the image data and pairs the configuration information from the user devices with the surveillance cameras. In examples, the user device configuration information includes location information for the surveillance cameras or user account information for owners of the surveillance cameras. The configuration images are derived from image data from the surveillance cameras using a remote analytics system or an analytics system integrated within the surveillance cameras.

In another example, the camera configuration information includes camera type information. Moreover, unregistered surveillance cameras can periodically sending image data to a registration server, which is used to pair the configuration information from the user device with the corresponding surveillance cameras. The method can also additionally store image data from the surveillance cameras to a cloud storage system after registration of the surveillance cameras.

In general, according to another aspect, the invention features a surveillance camera system. The surveillance camera system includes user devices on which configuration images are displayed, surveillance cameras, and a registration server. The surveillance cameras generate image data of the user devices on which the configuration images are displayed, and the registration server pairs configuration information from the user devices with corresponding surveillance cameras by reference to the configuration images. In one example, the configuration images are test patterns.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
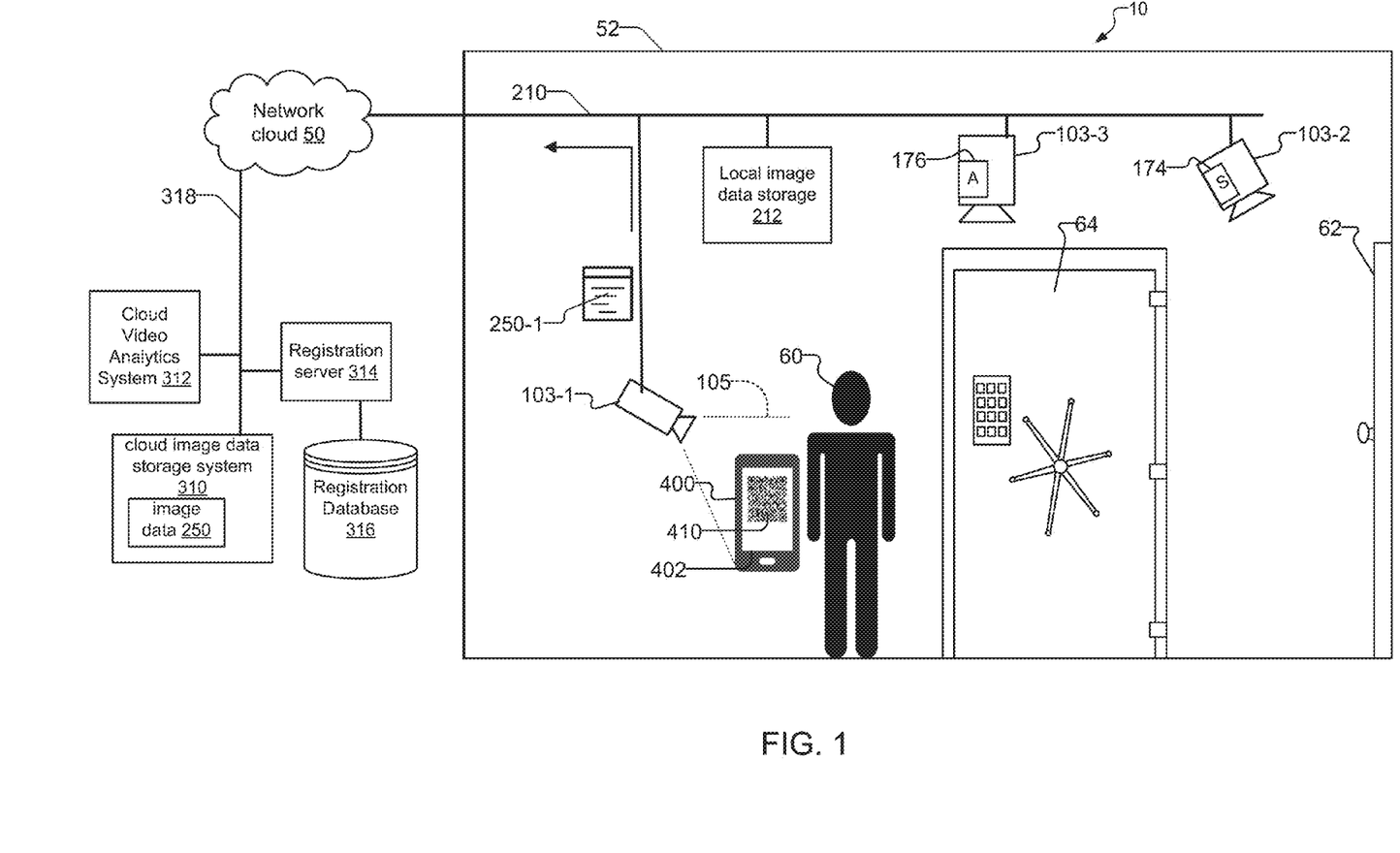
FIG. 1 is a schematic diagram showing surveillance cameras along with a technician with a mobile computing device in a registration process in which a registration server supplies configuration images to the mobile computing device and analyzes the image data from the surveillance cameras.

FIG. 1 shows an exemplary surveillance camera and image data storage system 10 to which the present invention is applicable.

The system 10 includes surveillance cameras 103 along with possibly other security devices installed at a premises 52 of an organization. The surveillance cameras 103 generate image data 250 and communicate with each other and with other security devices over a local (enterprise) network 210 which may be wired, wireless, or a hybrid of wired and wireless links.

A number of approaches may be employed in the alternative or in a hybrid fashion to store the image data 250 generated by the surveillance cameras 103-1, 103-2, 103-3. A local image data storage system 212 is shown, deployed on the local network 210. In other examples, each or some of the cameras 103 includes a camera image data storage system 174. Further, streams of image data 250 can be transferred over a network cloud 50 to a cloud or remote image data storage system 310.

The image data 250 can then be accessed over the network cloud 50 by user mobile computing devices 400 such as smartphones, tablet computing devices, laptop computer running operating systems such as Windows, Android, Linux, or IOS, in examples. User mobile computing devices 400 are also referred to as user devices. Each user device 400 includes a display screen or touch screen 402 and one or more applications 412, or "apps." The apps 412 execute upon the operating systems of the user devices 400.

A specific example showing how the cameras might be deployed is illustrated. Within the premises 52, camera1 103-1 focuses upon person 60 located within an aisle. Camera2 103-2 detects motion of individuals 60 near a door 62 providing entry to or exit from the premises 52. Finally, camera3 103-3 detects motion near a safe 64.

Other components of the system 10 are the video analytics systems. A cloud video analytics system is shown 312 that receives the image data from the surveillance cameras 103 via the network cloud 50. Here, the cloud video analytics system 312 might be managed by a third party hosting company and is presented to the enterprise local network 210 as a single virtual entity, in one example. In other examples, the analytics system is installed on the local network 210 and may be owned by the same business entity as the surveillance camera system 10. Further, an optional camera analytics system 176 integrated within one or more of the surveillance cameras 103 is another option.

Also shown is a registration server 314 and a registration database 316 on the network 318 of the cloud system. In one example, the registration server 314 is used to maintain user accounts for organizations that own surveillance camera systems 10. As a result, this registration server 314 is used, in one example, as part of a service that enables access to dedicated storage in the cloud image data storage system 310 for various organizations that subscribe to the service. In one embodiment, the registration server 314 includes a web server.

The registration server 314 could further be used to provide access to other services. It could provide subscribing organizations with remote analytics of the image data generated by the surveillance cameras 103 in the cloud video analytics system 312. In still other examples, the registration server 314 would use the cloud system to distribute image data 250 from the surveillance cameras 103 such as to user devices 400, As part of a registration process, as the surveillance cameras 103 are installed by an installer 60, for example, it is necessary to associate those surveillance cameras 103 with configuration information such as the account for the organization owning the premises 52 and/or subscribing to services available on the cloud network 318. Further, configuration information such as where are the surveillance cameras are installed, names for each of the surveillance cameras, the type and model of surveillance cameras 103 should also be stored to the registration database 316 in various examples. Still further, device data such as Internet Protocol (IP) addresses, media access control (MAC) addresses is also typically stored in connection with each of the surveillance cameras 103 and in connection with the account of the organization that owns or manages the surveillance cameras 103.

In the illustrated example, the pairing between the surveillance cameras 103 and the configuration information is achieved by using a user device 400 typically operated by the installer 60.

In more detail, the installer 60 places the user device 400 such that the surveillance camera is able to capture an image of the display 402 of the user device. That is, the display 402 of the user device 400 is placed within the field of view 105 of the surveillance camera 103-1 by the installer 60.

Displayed on display 402 is a configuration image 410. In one example, this configuration image is a Quick Response (QR) code. Moreover, this configuration image 410 is preferably supplied by the registration server 314. In one example, the registration server 314 downloads the image when the installer 60 invokes a camera registration web page supplied by the registration server 314. In other examples, the configuration image 410 is included in or accessed by or generated by an app 412 that is installed on the user device 400.

The image data 250 collected by the surveillance camera 103-1 is then processed on an analytics system. This could be the integrated analytic system 176, a local analytics system 212 installed on the local network 210 or the cloud video analytics system 312.

Wherever the image data is processed, the configuration image 410 is extracted and passed to the registration server 314 or otherwise compared to the configuration image 410 provided to the user device. This allows the registration server 314 to pair configuration information entered, for example, at the user device 400 with the specific surveillance camera 103-1 that captured the configuration image displayed by the user device 400.

Figure 2:
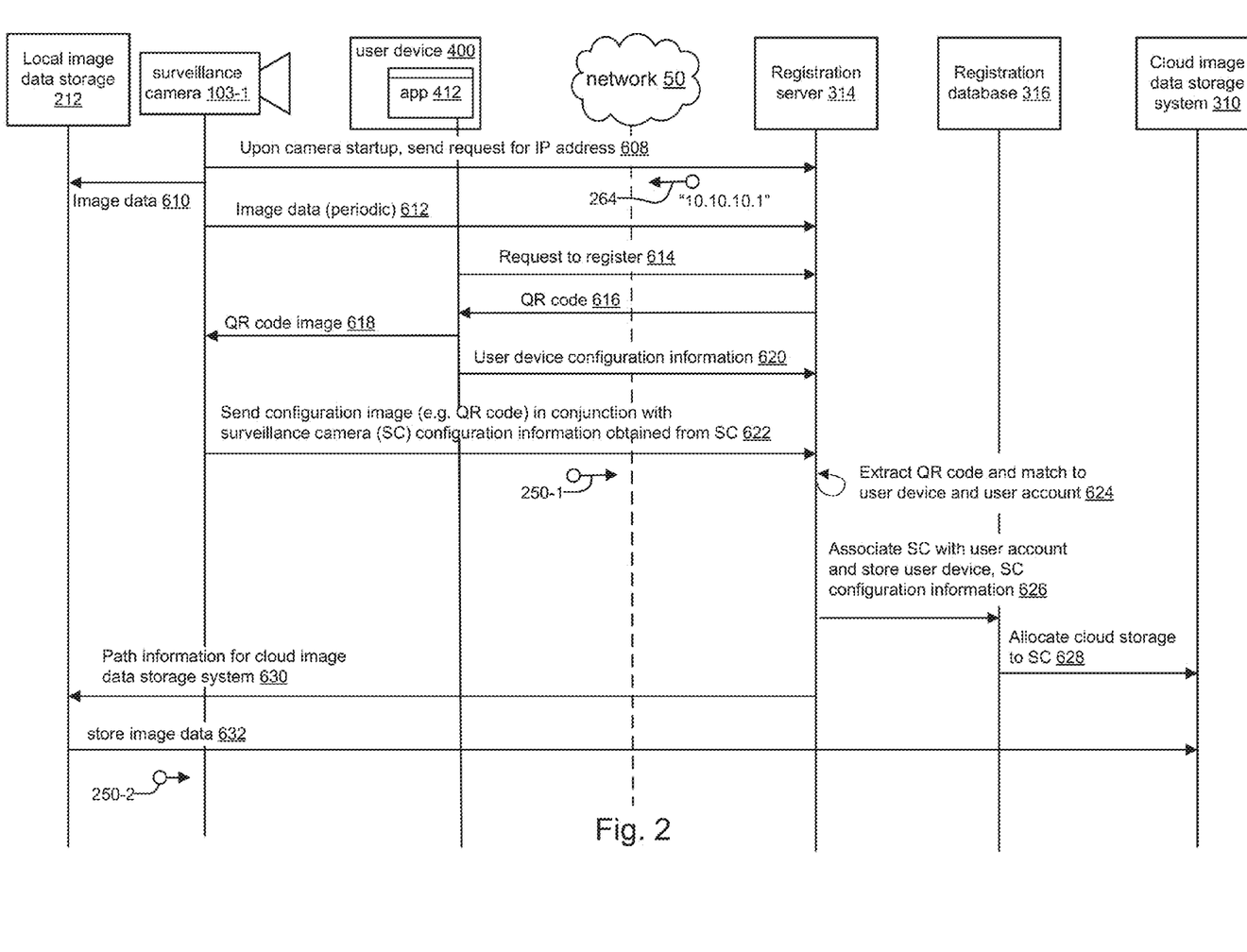
FIG. 2 is a sequence diagram showing a process for registering a surveillance camera by deriving the configuration images from the image data to pair the surveillance camera with configuration information entered via mobile computing devices.

FIG. 2 shows the process for pairing a surveillance camera with configuration information entered at a user device 400, for example.

In more detail, upon startup, the surveillance camera 103-1 sends a request to the registration server 314 for an IP address in step 608. In one example, the request references a preconfigured Universal Resource Locator (URL) of the registration server 314 for this purpose. After receiving an IP address 264 (in the example, "10.10.10.1") from the registration server 314, the process transitions to step 610.

During normal operation, the surveillance camera 103-1 stores image data to image data storage in step 610. In one example, a discrete local image data storage system 212 is used. In other examples, integrated image data storage 174 located on the surveillance camera. receives the image data 250. In still other examples, the image data could be stored in the cloud image data storage system 310.

The surveillance camera 103-1 begins sending image data 250 to the registration server 314 in step 612. In one example, the surveillance camera 103-1 sends the image data periodically, such as once a minute or when the surveillance camera is triggered to enter into a configuration mode. The surveillance camera can be triggered to enter the configuration mode in response to an installer pressing an associated button on the surveillance camera, in response to the installer selecting a configuration mode setting within the app 412 executing on the user device 400, or when the surveillance camera 103-1 is first powered-on and has never been configured before, in examples.

At the same time or in a generally contemporaneous fashion, the app 412 installed on the user device 400 is controlled by the installer 60 to send a "request to register" message to the registration server 314 in step 614.

In one example, a configuration image 410 is then sent by the registration server 314 to the app 412 executing on the user device 400 in step 616. The app could also generate this image and send it to the server 314. In one example, the configuration image 410 is a QR code. The image type, however, is not critical. The configuration image might be any random or predefined image or pattern, such as a test pattern.

The app 412 displays the configuration image 410 on the display 402 of the user device 400. In this way, in step 618, the configuration image is presented to the surveillance camera 103-1 so that the surveillance camera 103-1 can include the configuration image 410 within image data 250-1 of the scene that the surveillance camera 103-1 captures.

In this process, the user device 400 and specifically the app 412 executing on the user device sends configuration information to the registration server 314 in step 620. As discussed previously, this configuration information includes possibly a user account for the owner of the surveillance camera 103. Additional information, such as where the surveillance camera 103-1 is installed is also sometimes entered at the user device 400 and sent to the registration server 314. Other information such as a name for the surveillance camera, the type and model of surveillance camera 103 should also be passed to the registration server 314 and stored to the registration database 316, in various examples.

In step 622, the configuration image is sent to the registration server 314 by the surveillance camera 103-1 in conjunction with surveillance camera information obtained from the surveillance camera 103-1. In one example, the configuration image 410 is included in image data 250-1 captured by the surveillance camera 103-1.

Configuration information can include information such as the assigned Internet Protocol (IP) address 264, media access control (MAC) address, camera type and serial number, in examples. The configuration information can then be sent to the registration server 314 and stored in connection with the surveillance camera 103-1 and in connection with the account of the organization that owns or manages the surveillance cameras 103 in the registration database 316.

In step 624, the registration server 314 extracts the configuration image 410 (e.g. QR code) sent by the surveillance camera 103 in step 622. In this case, the registration server 314 derives the configuration image 410 from the image data 250-1 sent by the surveillance camera 103-1. To accomplish this, the registration server 314 sends the image data 250-1 to the cloud video analytics system 312, which then extracts the configuration image from the image data 250-1. In other examples, the configuration image 410 is extracted from the image data 250-1 using the local analytics system or an integrated analytic system 176 of the surveillance camera. In any event, the registration server 314 extracts and matches the configuration image 410 (e.g. QR code) with the user device 400 and probably with configuration information such as the user account that was typically entered at the user device 400.

In step 626, the registration server 314 associates the surveillance camera 103-1 with the user account and any other configuration information added at the user device 400 by the installer 60, for example, and/or provided by the surveillance camera 103-1. This information is stored in the registration database 316, in one example.

In one specific example, the registration database 316 or the registration server 314 allocates cloud storage in step 628 for the surveillance camera 103-1. Then, the registration server 314 sends path information for the cloud image data storage system to the local image data storage 212 in step 630. As a result, in step 632, image data 250-2 can now be stored to the cloud image data storage system 310 either directly by the surveillance camera 103-1 or by the local image data storage 212. In other examples, other services could be made available to the surveillance camera 103-1 such as image analytics provided by the cloud video analytics system 312.

Figure 3:
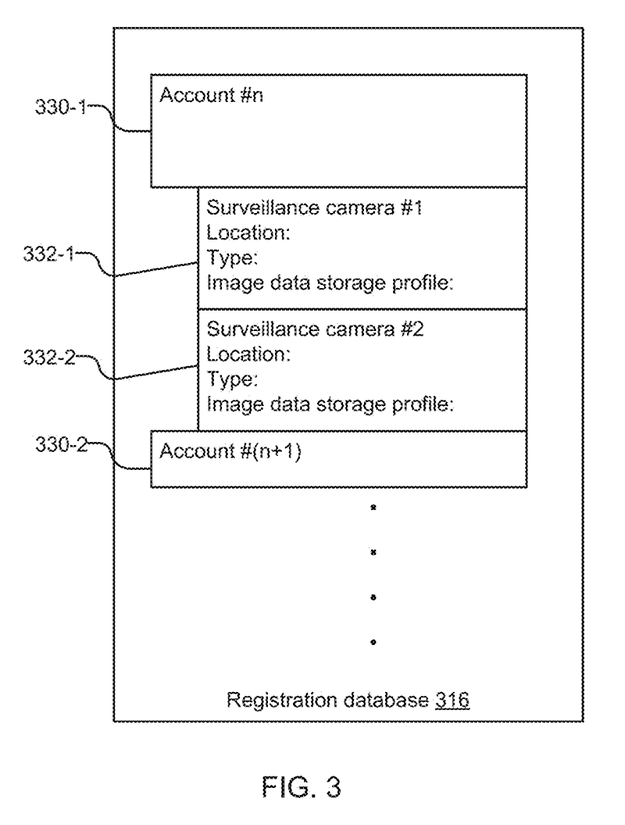
FIG. 3 is a schematic diagram illustrating the organization of information in the registration database.

FIG. 3 schematically illustrates exemplary content of the registration database 316. Specifically, the registration database holds many user accounts 330, account #1 330-1 . . . account #n, account #(n+1). For each of the accounts 330, configuration information 332-1, 332-2 is stored for each of the surveillance cameras 103 that have been associated with that account 330-1. This configuration information might include the location where each surveillance camera 103 is installed, the type of surveillance camera, and any image data storage profile information, such as the location within the cloud image data storage system 310 where the image data 250 from each surveillance camera is stored.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for configuring a surveillance camera for a premises, comprising:
   providing a cloud image data storage system that enables storage to and access to dedicated storage for organizations that own surveillance camera systems in the cloud image data storage system;
   a registration server maintaining user accounts for the organizations that own the surveillance camera systems;
   the registration server enabling access to the dedicated storage in the cloud image data storage system for the organizations by:
   surveillance cameras of the surveillance camera systems capturing image data that includes configuration images displayed on user devices,
   sending the image data from the surveillance cameras, when the surveillance cameras are triggered to enter into a configuration mode, to the registration server that derives the configuration images from the image data, and
   the registration server pairing configuration information from the user device with corresponding surveillance cameras by reference to the configuration images and associating the surveillance cameras with the user account for the organization owning the premises;
   allocating storage in the cloud image data storage system for the surveillance cameras;
   the surveillance cameras receiving path information to the allocated storage in the cloud image data storage system; and
   the surveillance cameras then storing image data to the allocated storage in the cloud image data storage system.

2. The method according to claim 1, wherein displaying the configuration images comprises displaying quick response (QR) codes.

3. The method according to claim 1, wherein the user device configuration information includes location information for the surveillance cameras.

4. The method according to claim 1, wherein the user device configuration information includes user account information for owners of the surveillance cameras.

5. The method according to claim 1, wherein the configuration images are derived from image data from the surveillance cameras using a remote analytics system or an analytics system integrated within the surveillance cameras.

6. The method according to claim 1, wherein the camera configuration information includes camera type information.

7. The method according to claim 1, further comprising unregistered surveillance cameras periodically sending image data to a registration server, which is used to pair the configuration information from the user device with the corresponding surveillance cameras.

8. A surveillance camera system, comprising:
a cloud image data storage system that enables storage to and access to dedicated storage for organizations that own surveillance camera systems in the cloud image data storage system;
user devices on which configuration images are displayed;
surveillance cameras for premises for generating image data of the user devices on which the configuration images are displayed; and
a registration server maintaining user accounts for the organizations that own the surveillance camera systems, sending the configuration images to the user devices when the surveillance cameras are triggered to enter into a configuration mode, receiving the image data from the surveillance cameras, deriving the configuration images from the image data, pairing configuration information from the user devices with corresponding surveillance cameras, associating the surveillance cameras with the user account for the organization owning the premises, and enabling data from the surveillance cameras to be stored to the cloud storage system after registration of the surveillance cameras by reference to the configuration images;
wherein storage is allocated in the cloud image data storage system for the surveillance cameras, the surveillance cameras receive path information to the allocated storage in the cloud image data storage system, and the surveillance cameras then store image data to the allocated storage in the cloud image data storage system.

9. The system according to claim 8, wherein the configuration images are quick response (QR) codes.

10. The system according to claim 8, wherein the user device configuration information includes location information for the surveillance cameras.

11. The system according to claim 8, wherein the user device configuration information includes user account information for owners of the surveillance cameras.

12. The system according to claim 8, wherein the camera configuration information includes camera type information.

13. The system according to claim 8, wherein the surveillance cameras periodically send image data to the registration server, which is used to pair the configuration information from the mobile device with the corresponding surveillance cameras.

14. The system according to claim 8, further comprising a remote analytics system that derives the configuration images from the image data from the surveillance cameras.

15. The system according to claim 8, further comprising an analytics system integrated within the surveillance cameras that derives the configuration images from the image data.

16. The system according to claim 8, wherein the configuration images are test patterns.

\* \* \* \* \*